(12) United States Patent
Babinet et al.

(10) Patent No.: US 12,017,166 B2
(45) Date of Patent: Jun. 25, 2024

(54) DEVICE FOR INSERTING A SECTION OF PACKING

(71) Applicant: L'Air Liquide, Societe Anonyme pour l'Etude et l'Exploitation des Procedes Georges Claude, Paris (FR)

(72) Inventors: Cyrille Babinet, Vitry sur Seine (FR); Eric Gallopin, Jouy-en-Josas (FR); Gilles Lebain, Vitry sur Seine (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 18/106,990

(22) Filed: Feb. 7, 2023

(65) Prior Publication Data
US 2023/0249096 A1 Aug. 10, 2023

(30) Foreign Application Priority Data
Feb. 8, 2022 (FR) ...................................... 2201088

(51) Int. Cl.
*B23P 11/00* (2006.01)
*B01D 3/32* (2006.01)

(52) U.S. Cl.
CPC ...................................... *B01D 3/32* (2013.01)

(58) Field of Classification Search
CPC .......... B01D 3/32; B01D 47/14; B01D 53/18; B01D 15/206; B01J 8/002; B01J 8/0035; B01J 15/00; B01J 19/325; B01J 4/007; B01J 2219/3086; B01J 2219/32206; B01J 2219/32213; B01J 2219/2453; B01J 2219/2458; B01J 20/3092;
(Continued)

(56) References Cited

U.S. PATENT DOCUMENTS

| | | |
|---|---|---|
| 2,604,220 A | 7/1952 | Frischmann |
| 4,929,012 A | 5/1990 | Slezak |

(Continued)

FOREIGN PATENT DOCUMENTS

| | | |
|---|---|---|
| DE | 36 10 457 | 7/1987 |
| JP | S57 94340 | 6/1982 |

(Continued)

OTHER PUBLICATIONS

French Search Report for FR 2 201 088, dated Sep. 16, 2022.

*Primary Examiner* — Jun S Yoo
(74) *Attorney, Agent, or Firm* — Justin K. Murray

(57) ABSTRACT

The present invention relates to an insertion device for inserting at least one section of packing for a gas/liquid separation column into a cylindrical casing, characterized in that a deployment module comprises a main member centred about a main axis of the insertion device, and a plurality of peripheral members arranged circumferentially and uniformly around the main axis, each of the peripheral members comprising an attachment means configured to grasp hold of a packing section, the deployment module comprising a plurality of branches arranged as pairs of branches connecting the main member to one of the peripheral members, the deployment module being able to modify the dimension of the insertion device by modifying a radial distance between the main member and each of the peripheral members.

12 Claims, 4 Drawing Sheets

(58) Field of Classification Search
CPC .. B01J 2219/3081; B01J 19/32; B01J 19/249; B66C 1/62
See application file for complete search history.

(56) References Cited

U.S. PATENT DOCUMENTS

| | | | | |
|---|---|---|---|---|
| 6,001,260 | A * | 12/1999 | Hatch | B01D 15/206 210/656 |
| 2010/0063304 | A1 | 3/2010 | Olbert et al. | |
| 2011/0120951 | A1* | 5/2011 | Hampton | B01D 15/206 210/657 |
| 2014/0126981 | A1 | 5/2014 | Le Sueur et al. | |
| 2014/0345140 | A1* | 11/2014 | Granger | E04H 7/22 29/897.33 |
| 2015/0198568 | A1* | 7/2015 | Haglund | B01D 15/10 248/161 |
| 2015/0336027 | A1* | 11/2015 | Eriksson | G01N 30/6047 29/428 |
| 2016/0152660 | A1* | 6/2016 | Avallin | G01N 30/6021 536/25.31 |
| 2019/0083899 | A1* | 3/2019 | Kanzler | B01D 3/32 |
| 2021/0245099 | A1 | 8/2021 | Yosida et al. | |

FOREIGN PATENT DOCUMENTS

| | | |
|---|---|---|
| JP | H01 242 102 | 9/1989 |
| JP | H11 333 283 | 12/1999 |
| JP | 2015 217 380 | 12/2015 |

* cited by examiner

[Fig. 3]
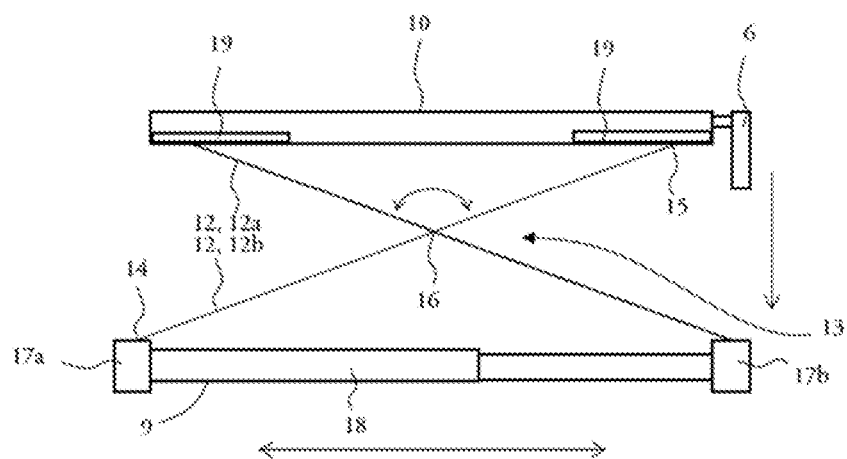
[Fig. 4]
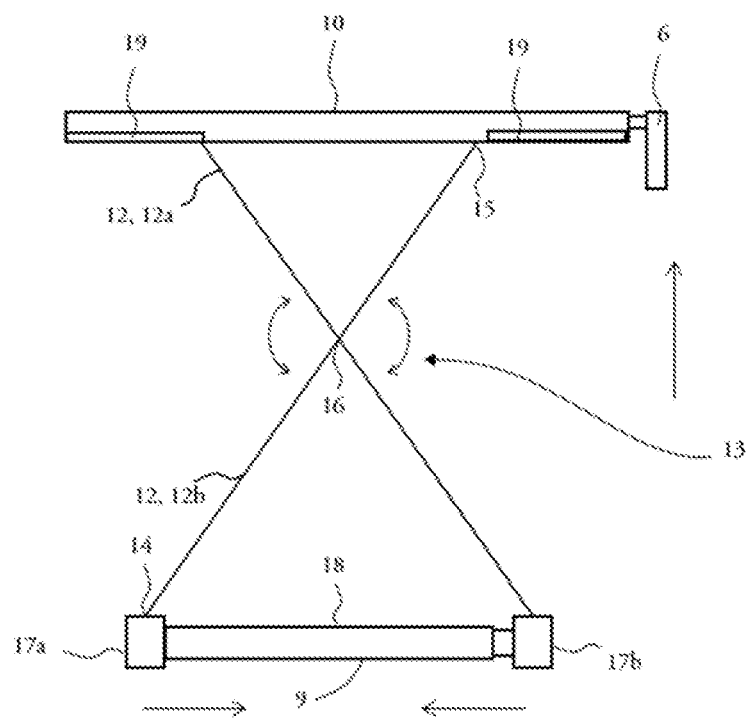

[Fig. 5]
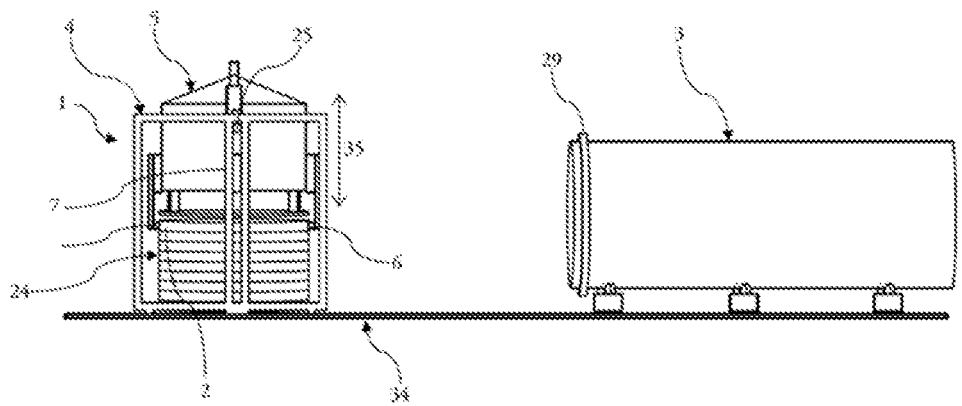
[Fig. 6]
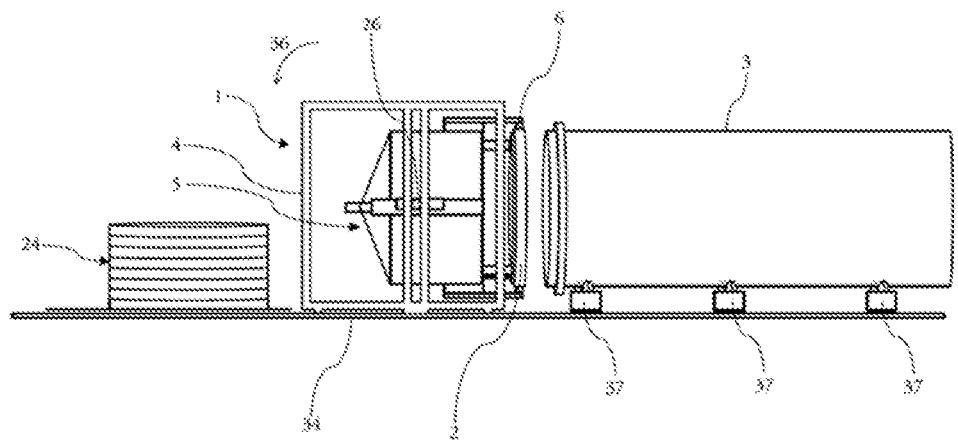

[Fig. 7]
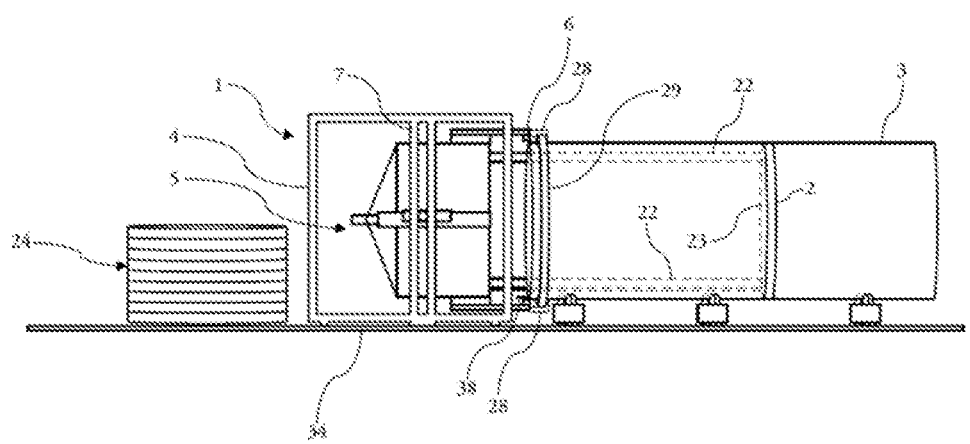

DEVICE FOR INSERTING A SECTION OF PACKING

CROSS REFERENCE TO RELATED APPLICATIONS

This application claims the benefit of priority under 35 U.S.C. § 119 (a) and (b) to French patent application No. FR2201088, filed Feb. 8, 2022, the entire contents of which are incorporated herein by reference.

FIELD OF THE INVENTION

The present invention relates to the field of gas/liquid separation columns, and to their assembly, and it concerns more particularly a device for inserting sections of gas/liquid separation column packing in a casing in order to form these said liquid/gas separation columns.

BACKGROUND OF THE INVENTION

Gas/liquid separation columns have been known for many years and allow, for example, various chemical elements incorporated in the composition of a homogeneous fluid to be separated, for example, by distillation or by absorption.

The manufacture of a liquid/gas separation column notably comprises a step whereby a packing-section insertion device grasps hold of a section of packing in order to subsequently insert it into a cylindrical casing. The packing sections are notably used in the columns in particular in order to ensure the exchange of material and heat between a rising gas and a descending liquid. These packing sections, which notably consist of a superposition of a plurality of corrugated strips, are often known as "packs". The sections of packing are conventionally stacked on one another, if applicable with interposed separators, in order to participate in the separation of the components of the fluid over the axial dimension of the column.

The insertion device needs to comprise attachment means that allow it to grasp hold of a section of packing by its sides. The grasping may, however, prove problematical insofar as the casings of the separation columns into which the sections of packing are to be inserted do not all necessarily have the same diameter. In that context, the sections of packing may have a diameter ranging from 2.5 m to 5 m, making it difficult to achieve optimal grasping of an entire range of packing sections.

It is conceivable to use an insertion device tailored to each diameter of packing section, but this solution entails too much financial investment to be viable.

SUMMARY OF THE INVENTION

Certain embodiments of the present invention make it possible to envision assembling liquid/gas separation columns for all diameters of packing section using a single insertion device for inserting these sections of packing into a casing. The present invention proposes an insertion device for inserting at least one section of packing for a gas/liquid separation column into a cylindrical casing, characterized in that a deployment module comprises a main member centred about a main axis of the insertion device, and a plurality of peripheral members arranged circumferentially and uniformly around the main axis, each of the peripheral members comprising an attachment means configured to grasp hold of a packing section, the deployment module comprising a plurality of branches arranged as pairs of branches connecting the main member to one of the peripheral members, the deployment module being able to modify the dimension of the insertion device by modifying a radial distance between the main member and each of the peripheral members.

Thanks to the insertion device according to certain embodiments of the invention, and more particularly to the deployment module, the attachment means can grasp hold of any type of packing section for a gas/liquid separation column, of any diameter. Before grasping hold of the packing sections, the deployment module is set up in such a way as to define the radial distance between the main member and the peripheral members, and thus position the attachment means, which are arranged on the peripheral members, relative to one another in such a way as to form a pattern, notably a circular pattern, of dimensions that complement the periphery of the section of packing that is to be grasped. The radial distance between the main member and each of the peripheral members is the same, so as to obtain a virtual diameter defined by the attachment means and tailored to the diameter of the sections of packing.

The main member can have a main dimension that coincides with the main axis. The latter, about which the attachment means are arranged, may also pass through the centre of the packing section when the latter is grasped and/or through the centre of the casing. The peripheral members are all parallel or substantially parallel to the main axis. The attachment means may be arranged on all of the peripheral members or on just some of them. In order to grasp hold of the section of packing, the insertion device comprises at least two attachment means. Advantageously, the attachment means are uniformly distributed around the main member so as to grasp hold of the section of packing optimally.

The pairs of branches extend between the main member and the peripheral members. There are therefore as many pairs of branches as there are peripheral members. The branches of each pair of branches are secant with one another and able to incline themselves relative to one another to a greater or lesser extent in a synchronized manner. It is this modification to the inclination of the branches of the pairs of branches that makes it possible to modify the radial distance between the main member and the peripheral members, and that thus makes it possible to modify the radial dimension of the insertion device and adapt this dimension to suit the corresponding radial dimension of the section of packing that is to be handled.

According to one feature of certain embodiments of the invention, the main member comprises a telescopic body able to modify a main dimension of the main member. The main dimension of the main member, which is to say the dimension of the main member parallel to the main axis, and therefore be modified using the telescopic body and to as great an extent as this body will permit. The telescopic body may extend over the entirety of the main member or just over a portion thereof. Deployment of the telescopic body may be controlled manually, by means of an operator acting on one of the terminal portions of the main member, or else may be motorized and controlled remotely via an electric motor and an associated control module.

According to one feature of certain embodiments of the invention, the main member comprises two fixed rings, each fixed ring being arranged at the level of each of the terminal portions of the main member, the two fixed rings being separated by a distance that can be modified by the telescopic body. Advantageously, the rings are arranged at each of the longitudinal ends of the main member and are fixed to these ends. Thus, when the main member has its main dimension modified by means of the telescopic body, the fixed rings can be moved closer together or further apart according to the configuration applied to the telescopic body. The distance between the rings can thus be determined between a minimum distance and a maximum distance, both of these dependent on the capacity for deployment of the telescopic body. The maximum distance thus corresponds to a configuration in which the main member is fully deployed, while the minimum distance corresponds to a configuration in which the main member is retracted as far as possible.

According to one feature of certain embodiments of the invention, each branch of the pairs of branches comprises a first end fixed to one of the fixed rings of the main member and a second end fixed to the peripheral member. In other words, each pair of branches comprises a first branch of which the first end is fixed to a first fixed ring of the main member, and a second branch of which the first end is fixed to a second fixed ring of the main member. Thus, when the main dimension of the main member is modified by the deployment of the telescopic body, the distance between the fixed rings is also modified and this by analogy leads to a modification to a distance between the first end of each of the branches of the pairs of branches. The fixed rings and the first end of the branches may be fixed together in various ways but must always allow the branches to pivot relative to the fixed rings.

Because the second end of each of the branches is fixed to the peripheral member, each of the branches therefore extends between the main member and one of the peripheral members. Just like the fixing between the first end of each branch and one or other of the fixed rings of the main member, the fixing between the second end of each branch and the peripheral member needs to be effected in such a way that each branch is able to pivot with respect to the peripheral member.

According to one feature of certain embodiments of the invention, the second end of at least one of the branches of the pair of branches is able to slide along the peripheral member. In order to achieve this, the peripheral member may, for example, comprise a guideway in which the second end of at least one of the branches of the pair of branches slides. Both of the branches may slide along the peripheral member, but it is possible to render one of the second ends fixed while the other second end is able to slide.

According to one feature of the invention, the two branches of the pair of branches are secant with one another.

As a preference, they are connected to one another at their point of intersection.

According to one feature of certain embodiments of the invention, the branches of one same pair of branches are connected to one another by a pivot connection substantially at their centre. In other words, the two branches of a pair of branches are arranged relative to one another in such a way as to be secant and a pivot connection is formed at the point of intersection of the two branches. When the length of the main member is modified by means of the telescopic body, the distance between the fixed rings and, therefore, the first ends of the branches of the pairs of branches, is modified. The pivot connection allows the inclination of the branches of the pair of branches relative to one another to be modified, and this also modifies the inclination of the branches with respect to the corresponding peripheral member, notably thanks to the sliding of at least one of the branches along a peripheral member.

According to one feature of certain embodiments of the invention, the insertion device comprises locking means configured to fix the radial distance between the main member and the peripheral members. The locking means are put in place once the desired radial distance between the main member and the peripheral members has been obtained by modifying the configuration of the deployment module. The positioning of the attachment means relative to one another and relative to the main member is then fixed, and allows the section of packing to be grasped and held effectively.

According to one feature of certain embodiments of the invention, the locking means are formed by deployable rods extending between two adjacent peripheral members. Each peripheral member is therefore connected to two deployable rods extending towards the two adjacent peripheral members. The deployable rods are rigid and therefore stabilize the peripheral members between them.

Certain embodiments of the invention can also include an insertion system for inserting at least one section of packing for a gas/liquid separation column into a cylindrical casing, comprising a bearing structure and an insertion device as described hereinabove, the insertion device being borne by the bearing structure. The insertion system in its entirety performs additional functions such as moving the insertion device. The insertion system allows the insertion of a plurality of sections of packing to be strung together in a sequence.

The bearing structure takes the form of a gantry able to move in at least one direction while carrying the insertion device grasping a section of packing. In order to bring about such movement, the bearing structure may, for example, be arranged on rails so that the movement is in the most precise direction possible.

As has already been mentioned, the objective of the insertion system according to the invention is to grasp hold of sections of packing of different diameters and then insert these into a casing arranged horizontally.

According to one feature of certain embodiments of the invention, the insertion device is able in its entirety to perform a translational movement relative to the bearing structure. Independently of the bearing structure, the insertion device may for example move vertically. This vertical movement is useful for example for positioning the insertion device in vertical alignment with a pile of packing sections, and then for lowering it so that it can grasp hold of the section of packing that is at the top of the pile. The vertical movement of the insertion device relative to the bearing structure is also useful for the purposes of adjusting the position of the section of packing that has been grasped so that it can be correctly positioned at the entrance to the casing, thus making it easier for the section of packing to be pushed into the casing. The relative movement of the insertion device relative to the bearing structure may for example be achieved by means of a motor carried onboard the bearing structure and configured to move a bearing element bearing the insertion device along the bearing structure.

According to one feature of certain embodiments of the invention, the insertion device is able in its entirety to perform a rotational movement relative to the bearing structure. The rotation notably allows the insertion device to be tilted, with a bearing structure that remains fixed, between a position in which the insertion device is arranged vertically for the purposes of grasping hold of a section of packing on a vertical pile of packing sections, and a position in which the insertion device is arranged horizontally with a view to inserting the grasped packing section into the casing. The rotation elements therefore need to be configured to allow the insertion device to rotate by around 90°, so that the insertion device can tilt between the aforementioned vertical and horizontal positions. The relative rotation of the insertion device relative to the bearing structure may for example be achieved by means of a motor able to operate a system of gears causing the insertion device to rotate, or else operating via a chain system or a hydraulic system.

Certain embodiments of the invention can also cover a method for inserting at least one section of packing into a cylindrical casing, which method is implemented by an insertion system as described hereinabove and comprising:
- a step of adjusting the radial distance between the main member and the peripheral members using the deployment module,
- a step whereby the attachment means of the insertion device grasp hold of a section of packing,
- a step whereby the insertion device in its entirety is rotated relative to the bearing structure,
- a step whereby the insertion system is moved as far as the casing by the bearing structure,
- a step whereby the packing section is positioned at an entrance to the casing,
- a step whereby the packing section is pushed into the casing.

The steps of the method are performed by means of the various aforementioned elements of the insertion system. As already described hereinabove, the deployment module performs the step of adjusting the radial distance between the main member and the peripheral members. Thereafter, the grasping step is performed using the attachment means of the insertion device, the rotation step is performed by means of the rotation elements carried onboard the bearing structure, the movement step is performed by the bearing structure, and the positioning step is performed by means of the means of effecting translational movement of the insertion device relative to the bearing structure. Once these first five steps have been performed, the pushing step can be performed using telescopic devices that insert the section of packing into the casing. It should be noted that what is given here is a non-exhaustive list of steps for correct operation of the method of inserting sections of packing into the casing according to the invention. By way of nonlimiting example, the method according to the invention can provide a step of checking the correct positioning of the section of packing once it has been inserted into the casing. This additional step, which in this instance comes after the pushing step, then consists in checking and logging the correct position of the section of packing that has just been inserted, using measurement apparatus that is accurate to within a millimetre.

BRIEF DESCRIPTION OF THE DRAWINGS

Other features and advantages of the invention will become further apparent through, on the one hand, the following description and, on the other hand, various exemplary embodiments given by way of nonlimiting indication with reference to the attached schematic drawings in which:

FIG. 1 Is a general arrangement of an insertion system according to the invention during the insertion of a section of packing for a gas/liquid separation column into a casing, FIG. 2 depicts the insertion system of FIG. 1, the elements of which are engaged with a section of packing for a gas/liquid separation column, the figure notably revealing the structure of a deployment module that allows the grasping of packing sections of a desired size, FIG. 3 is a schematic depiction of a detail of the deployment module visible in FIG. 2, in a closed-up first position, FIG. 4 is a schematic depiction of a detail of the deployment module visible in FIG. 2, in a deployed second position, FIG. 5 depicts a step of grasping hold of a section of packing in a packing-section insertion method, FIG. 6 depicts a step of rotating the insertion device and of moving the insertion system in the method for inserting gas/liquid separation column packing sections, FIG. 7 depicts a step of inserting the section of packing in the method for inserting gas/liquid separation column packing sections.

DETAILED DESCRIPTION OF THE INVENTION

Figures 1, 2:
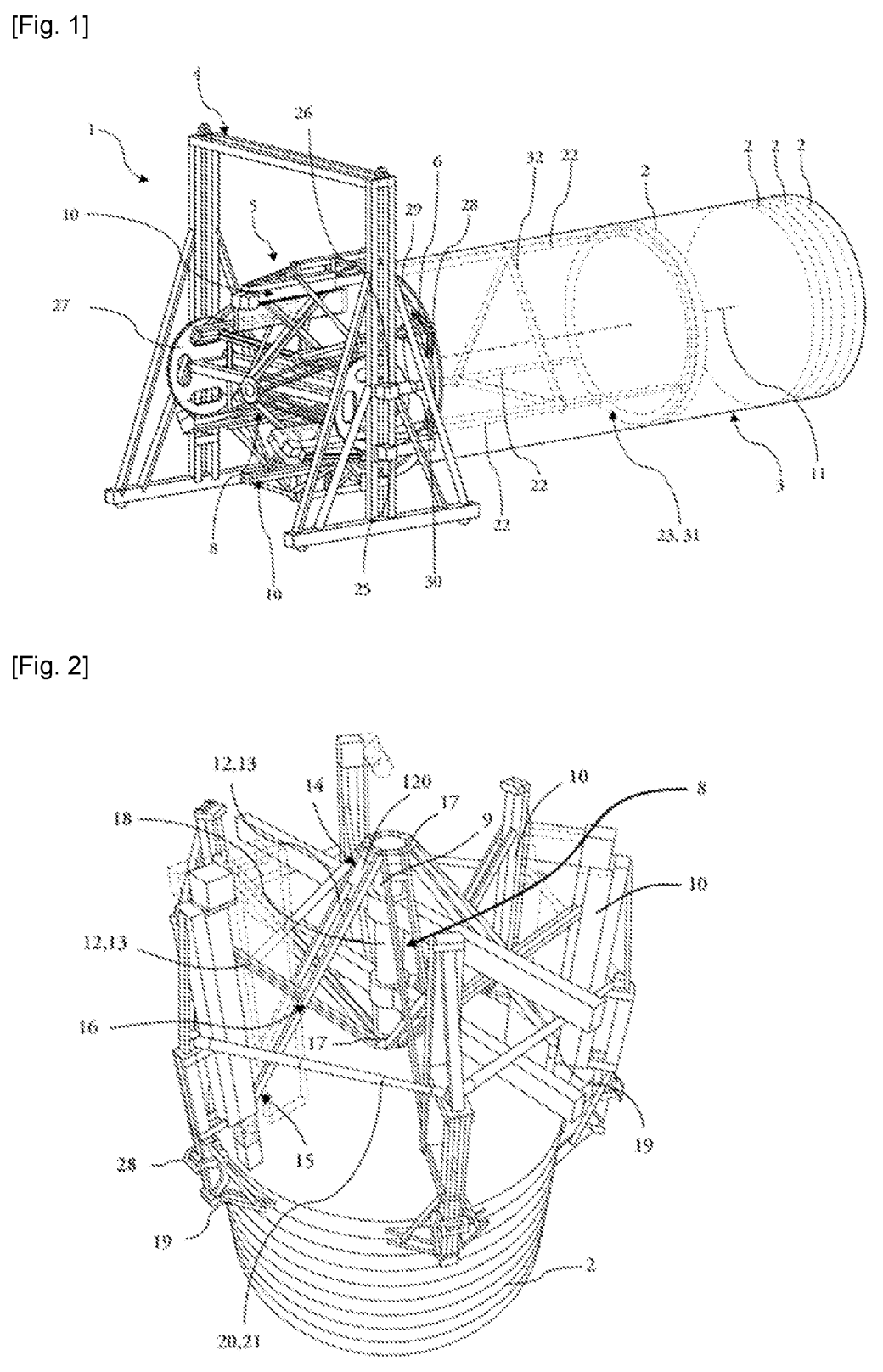

FIG. 1 depicts an insertion system 1 for inserting sections 2 of gas/liquid separation column packing in a casing the purposes of forming a gas/liquid separation column. Such separation columns take for example a cylindrical shape of circular or substantially circular cross section. The separation columns may have a main dimension of several tens of metres and a cylindrical cross section of several metres. The packing sections 2 for a gas/liquid separation column that are intended to be inserted into these separation columns may have a circular or substantially circular cross section with a diameter of the order of 2.5 m to 5 m.

Here, the insertion system 1 allows sections of packing to be inserted horizontally into the casing, something which may notably prove advantageous for reasons of mechanical bulk in terms of height that make it impossible for the operation of inserting the packing sections to be performed when the casing is arranged vertically so that said operation is performed here with the casing in a horizontal position. It should, however, be noted that this arrangement of the insertion system and the inserting of the packing sections 2 in a horizontal direction as illustrated, could be altered without departing from the context of the invention, provided that the insertion system comprises a deployment module as will be described hereinafter.

The packing-section insertion system 1 according to the invention allows implementation of a method for inserting said packing sections 2 into the casing. Such an insertion system 1 notably makes it possible to grasp hold of a section 2 of packing on a vertical pile 24 of packing sections, as illustrated in FIG. 1. The insertion system 1 then allows a rotation to be performed so as to position the packing section 2 facing an entrance to the casing, movement towards the entrance to the casing, and then allows the packing section 2 to be pushed to the far end of casing or up against another packing section 2 already inserted into the casing, feeding of the packing section 2 into the casing as smoothly as possible, which is to say with the fewest possible number of jolts.

In order to achieve this, the insertion system 1 comprises a bearing structure 4 as well as an insertion device 5 arranged on the bearing structure 4 and notably comprising attachment means 6 for grasping the sections 2 of packing. The bearing structure 4 takes the form of a gantry comprising two legs 7 between which the insertion device 5 rests. The bearing structure 4 may for example be mounted on rails so that the insertion system 1 can perform a linear movement between the pile 24 of packing sections 2 and the casing.

In the example illustrated, the insertion system 1 comprises a first motor 25 allowing the insertion device 5 to perform in its entirety a translational movement relative to the bearing structure 4. The insertion system 1 also comprises a second motor 26 able to actuate a system of gears 27 allowing the insertion device 5 to be moved in its entirety so as to perform a relative rotation relative to the bearing structure 4. This rotation allows the insertion device to be moved from a vertical position to a horizontal position so that the section 2 of packing can be positioned facing the entrance to the casing, as mentioned hereinabove.

As mentioned previously, the diameter of the sections of packing may vary between 2.5 m and 5 m. Before the sections of packing are grasped, it is important to be able to adapt the insertion device to suit the diameter of the packing section concerned, this being so that the attachment means can grasp the packing sections optimally and as reliably as possible. Thus, before proceeding with the step of grasping the section of packing during the course of the method of inserting same, the insertion device needs to be dimensioned appropriately.

To do this, the insertion device 5 comprises a deployment module 8 comprising the attachment means 6. More specifically, the deployment module 8 comprises a main member 9 and a plurality of peripheral members 10 parallel to the main member 9. The main member 9 extends mainly along a main axis 11 passing through the centre or substantially through the centre of the grasped packing section 2. The peripheral members 10 are arranged circumferentially and uniformly around the main member 9. It is on the peripheral members 10 that the aforementioned attachment means 6 are arranged. The deployment module 8 comprises at least two peripheral members 10. Advantageously, and as notably visible in FIG. 2, the deployment module comprises at least six peripheral members.

Each peripheral member 10 is mechanically connected to the main member 9 by two branches 12 forming a pair of branches 13. Each of the two branches 12 comprises a first end 14 connected to the main member 9 and a second end 15 connected to the peripheral member 10. In addition, the two branches 12 of the pair of branches 13 are secant with one another and are connected to one another at their point of intersection, which is to say substantially at their centre, by a pivot connection 16. In the example illustrated, each branch 12 is formed of two parallel members secured to one another by a spacer 120, these spacers maintaining the mutual separation of the branches. For one pair of branches 13, the branches 12 have a different separation between their members, so that a first branch, the members of which are farther separated than those of the second branch, flanks the second branch at the point of intersection. The members of one of the branches each have a pin directed towards the members of the other branch and able respectively to engage in a corresponding orifice formed in one of the members of the other branch.

It is notably thanks to the pairs of branches 12 of the deployment module 8, and more particularly to the modification to an inclination of the branches of each pair of branches, that a radial distance between the main member 9 and the peripheral members 10 can be adjusted and that the attachment means 6, arranged on said peripheral members 10, can thus be brought closer towards or moved further away from the main axis according to an adaptable diameter, thus ensuring compatibility with a wide range of packing-section diameters. This modification to the radial distance is performed simultaneously between the main member and all of the peripheral members. Details regarding the operation of the deployment module will be described hereinafter.

Thanks to the deployment module, the attachment means are thus positioned, and notably separated relative to one another, in order to correctly take hold of the section of packing, regardless as to the diameter thereof.

Once the desired radial distance has been established, this can be fixed by a locking means 20. The locking means 20 may for example be associated with a plurality of deployable rods 21 extending between two adjacent peripheral members 10, as illustrated in FIG. 1.

Because the section 2 of packing is gripped by its edge, combined with the fact that the packing sections 2 have a cylindrical shape of circular or substantially circular cross section, the attachment means 6 take the form of an arc of a circle, this being so that the attachment means 6 as a whole, which is intended to be in contact with the section 2 of packing, conforms to a radius of curvature of that section. The grasping of the packing section 2 is thus easier and more stable. To ensure optimal grasping of the section 2 of packing by the attachment means 6, the curvature of the arc of a circle formed by the attachment means 6 is adjustable so as to adapt to suit all diameters of packing sections 2.

Once the section 2 of packing has been grasped by the attachment means 6, these can be controlled individually relative to one another with a view to pushing on a very specific point of the section 2 of packing and deforming the latter locally. Such a local deformation may be recommended when there is a differential in shape between the section 2 of packing and the casing into which the packing section 2 is intended to be inserted. The local deformation thus makes it possible to slightly modify the shape of the section 2 of packing so that it can then be inserted more easily into the casing.

At least two peripheral members 10 each comprise a hook 28. When the insertion device 5 is positioned near the casing 3 with a view to subsequently inserting a section 2 of packing therein, the hooks 28 close onto the casing 3, for example onto a flange 29 extending circumferentially around the casing 3 at the end of the casing 3 via which the sections 2 of packing are inserted. The hooks 28 thus mechanically hold the casing 3 facing the insertion device 5, even while the section 2 of packing is being inserted into the casing 3. The presence of these hooks 28 provides enough counterweight to hold the casing 3 in place despite the forces exerted on it as the sections 2 of packing are being inserted. The hooks 28 thus prevent the need for a bulky counterweight positioned to the rear of the casing 3 to arrest it while the section 2 of packing is being pushed.

In order to be able to close onto the flange 29 of the casing 3, the hooks 28 need to extend along each of the peripheral members 20, beyond the attachment means 6 also borne by the peripheral members 20. This extension may create a mechanical impediment when the attachment means 6 are grasping a section 2 of packing on the pile of packing sections, particularly when it is the last packing section 2 of the pile that is being grasped, because the hooks 28 may then hit the ground. In order to alleviate this problem, each of the hooks 28 is mounted on a retractable ram 30 so that the hooks 28 can be retracted, avoiding any mechanical stress associated with a deployed hook 28. The hooks 28 are thus able to move between a retracted position, notably when the insertion device 5 is in a vertical position for grasping the sections 2 of packing, and a deployed position that allows the insertion device 5 to be fixed to the casing 3 at the moment at which the grasped packing section 2 is being held at the end of the casing 3. When the hooks 28 are in the deployed position, they are configured to avoid any mechanical interference with the attachment means 6 arranged on the same peripheral member 10. In order to avoid said mechanical interference, the hooks 28 may have a particular shape and/or may retract and extend pivoting about the peripheral member 10 concerned, the pivoting being away from the main member so as not to come into contact with the attachment means 6.

At least two of the peripheral members 10 are provided with telescopic devices 22. The telescopic devices 22 may be arranged on a peripheral member 10 that is also provided with an attachment means 6, the essential thing being that the combination of these elements should not interfere mechanically with one another. The telescopic devices 22 are able to push on the section 2 of packing once it has been positioned facing the casing. This pushing is performed as soon as the attachment means 6 have been commanded to release the section 2 of packing.

The telescopic devices 22 deploy so as to push the section 2 of packing as far as the far end of the casing, and regardless of the length thereof. If one or more sections 2 of packing have already been inserted into the casing beforehand, the telescopic devices push the section 2 of packing until it comes into contact with the previously-inserted section 2 of packing.

In order for the section 2 of packing to be inserted uniformly into the casing, with the minimum of jolts, the insertion device 5 comprises a pushing means 23 fixed to the end of each telescopic device 22, as is more particularly visible in FIG. 7, this pushing means being intended to be in direct contact with the section 2 of packing as it is being inserted. The pushing means 23 mechanically distributes the forces exerted by each of the telescopic devices 22 by pressing on the entire periphery of the section 2 of packing, so as to avoid the forces being localized only at the location of the end of the telescopic devices 22. The pushing means 23 thus makes it possible to avoid the section 2 of packing being inserted becoming damaged as a result of a localized pushing force. When the telescopic devices 22 are collapsed, the pushing means 23 is positioned in the vicinity of the peripheral members 10. The telescopic devices and the pushing means as are illustrated in FIG. 1 constitute one example of means for inserting the section of packing, but the latter could be inserted in other ways and with other means without departing from the context of the invention, provided that the insertion device employs a deployment module in accordance with the invention.

By way of example, as illustrated in FIG. 1, the insertion device 5 comprises six peripheral members 10 of which three are provided with telescopic devices 22. The distribution of the telescopic devices 22 is that they are distributed uniformly about the main axis 11.

In order to insert sections 2 of packing that may reach significant diameters, each of the telescopic devices 22 has a pushing force of at least 1 t. This pushing force is distributed over the entire periphery of the packing section 2 by means of the pushing means 23.

The telescopic devices 22 deploy at the moment at which the section 2 of packing is positioned facing the entrance to the casing 3. When the insertion of the section 2 of packing is initiated, the pushing means 23 is driven by the deployment of the telescopic devices 22 and comes into contact with the section 2 of packing. The zone of contact of the pushing means 23 on the section 2 of packing corresponds at least to a peripheral annular zone 31 related to the packing section 2 pushed. The peripheral annular zone 31 thus faces a periphery of the section 2 of packing, which is to say is in the vicinity of an edge of the section 2 of packing.

As the section 2 of packing is being pushed, the force exerted by the telescopic devices 22, and by analogy by the pushing means 23, is preferably located at the periphery of the section 2 of packing, because it is at the periphery that the forces opposing the pushing arise, notably the forces of friction of the packing section 2 against the walls of the casing 3. The pushing performed on the peripheral annular zone 31 therefore makes it possible to compensate for the friction forces applied to the packing section 2 as the latter is being inserted into the casing 3. The compensation for the friction forces is particularly effective with the insertion device 5 according to the invention because the pushing means 23 is positioned as close as possible to the location of these friction forces. As illustrated in FIG. 1, the pushing means 23 advantageously has an annular shape, the radial dimension of which corresponds to the dimension of the peripheral annular zone 31 of the section 2 of packing.

Because the deployment module is able to adapt to suit various diameters of packing section 2, a number of pushing means 23 of different sizes are designed, and the appropriate pushing means 23 is installed once the appropriate radial distance between the main member and the peripheral members 10 has been determined.

In spite of the uniform distribution of the telescopic devices 22 and the presence of the pushing means 23, it is possible that a friction force exerted on the section 2 of packing in the process of being inserted might be of greater intensity locally. This localized friction force may be due to a horizontal position of the casing 3 and/or that of the section 2 of packing. Gravity may also cause the section 2 of packing to press more heavily against the wall of the casing 3, thus giving rise to asymmetry in the resulting forces of contact between the section 2 of packing and the casing 3. Other factors that generate a localized friction force may also come into play, such as, for example, a surface finish of the wall of the casing 3 or a surface finish of the edge face of the section 2 of packing. In order to even out the pushing force, each telescopic device 22 may be controlled individually relative to one another in order to intensify one or another of the pushing forces so as to compensate for an elevated local friction force. In order to detect these local friction forces, each end of each telescopic device 22 may for example comprise a resistance sensor measuring the friction forces and therefore able to detect an elevated friction force.

When the telescopic devices 22 deploy to push the section 2 of packing into a casing 3 of significant length, for example several tens of metres long, the telescopic devices 22 deploy until they attain an appreciable length which may prove detrimental to their stability. The insertion device 5 may therefore comprise a retaining member 32 connected to all of the telescopic devices 22 and arranged in such a way as to be substantially equidistant between the pushing means 23 and the entrance to the casing 3. The retaining means 32 has the role of maintaining the position of each of the telescopic devices 22 and the distance between each of them. The retaining means 32 therefore contributes to distributing the forces applied to the section 2 of packing being inserted. The retaining means 32 also ensures the stability of the telescopic devices 22, preventing potential bending thereof which could arise in instances in which said telescopic devices 22 are extended to a great length. As has been illustrated in FIG. 1, the retaining member 32 has a triangular shape so as to keep three telescopic devices 22 equally distributed about the main axis 11. However, the shape of the retaining member 32 may vary according to the number of telescopic devices 22 included in the insertion device 5. In a variant which has not been depicted, the retaining member 32 may comprise a set of rollers, each positioned in the continuation of the branches of the retaining member, beyond the telescopic devices, and which are respectively in contact with the internal face of the peripheral wall of the casing. The aim there is to provide continuous guidance of the retaining member inside the casing as the telescopic devices deploy and the section of packing is inserted. This continuous guidance, through contact between at least one of the rollers and the casing, facilitates the insertion despite the weight of the entity formed by the telescopic arms and the pushing means 23, which could cause the entity to run out of true. As an alternative or in addition, the pushing means may also comprise one or more rollers arranged at the periphery to be in contact with the internal face of the tubular wall of the casing as the sections of packing are inserted into the casing.

FIG. 2 more particularly reveals the deployment module, depicted here without the associated bearing structure. The operation of the deployment module will be described more specifically with reference to this FIG. 2 and to FIGS. 3 and 4; and the way in which the radial distance between the main member and the peripheral members is modified will notably be described.

The main member 9 comprises two fixed rings 17, each of the fixed rings 17 being arranged at each terminal portion of said main member 9. The main member 9 comprises a telescopic body 18 able to modify a main dimension of the main member 9. Thus, by modifying the length of the main member 9 it is possible to increase or to reduce the distance between the two fixed rings 17. The length of the main member 9 can be adjusted manually or via a control member which has not been depicted. The telescopic body 18 makes it possible to modify the length of the main member 9 by deploying or retracting at least one of the terminal portions thereof.

The first end 14 of each branch 12 of the pair of branches 13 connecting the main member 9 to one of the peripheral members 10 is more particularly connected to one of the fixed rings 17 arranged on the main member 9. Each pair of branches 13 thus comprises a first branch 12*a* of which the first end 14 is fixed to a first fixed ring 17*a*, and a second branch 12*b* of which the first end 14 is fixed to a second fixed ring 17*b*. The second end 15 of the two branches 12 is itself fixed to the peripheral member 10 and at least one of these can slide along this member, for example via a guideway 19 formed on one of the faces of the peripheral member 10. In the example illustrated, two guideways 19 are depicted so that each of the second ends 15 is mounted with the ability to slide along the corresponding peripheral member, but it should be noted that it is possible for just one of the two second ends 15 to collaborate with a guideway without departing from the context of the invention, provided that the sliding of this second end does not block the deployment of the telescopic body.

Thus, when the length of the main member 9 is modified by means of the telescopic body 18, the distance between the fixed rings 17 and, therefore, the distance between the first ends 14 of each of the two branches 12, are also modified. Because the branches 12 are connected at a point that forms a pivot connection 16, this point tends to move closer towards or further away from the main member 9 according to whether the first ends 14 are moving further apart or closer together. The movement of the telescopic body 18 thus causes a modification to the inclination of the branches 12 of each of the pairs of branches 13 and thus modifies the radial distance between the main member 9 and the peripheral members 10.

As mentioned hereinabove, the deployment module 8 thus has the function of modifying a radial distance between the main member 9 and each of the peripheral members 10, the attachment means 6 for grasping hold of the section of packing being arranged on said peripheral members 10, whether or not these are associated with telescopic devices 22 as mentioned previously and in respect of which a telescopic-device actuating unit has been depicted in dotted line in FIG. 2. The attachment means 6 may thus be moved apart in order to be able to engage around sections 2 of packing of different diameters. The greater the length of the main member 9, the more the fixed rings 17 are moved away from one another and the closer the peripheral members 10 become to the main member 9, adapting the insertion device 5 to suit a small diameter of packing section 2. Conversely, the shorter the length of the main member 9, the more the fixed rings 17 are moved towards one another and the farther apart the peripheral members 10 become from the main member 9, adapting the insertion device 5 to suit a large diameter of packing section 2. The deployment module 8 as has just been mentioned therefore allows the insertion device 5 to be adapted to suit a plurality of diameters of packing sections 2 and of casings.

FIG. 3 illustrates a first example of inclination of the pair of branches 13 so as to define a minimum radial distance between the main member 9 and the peripheral members 10. In this configuration, the telescopic body 18 is deployed to the maximum extent so that the length of the main member 9 is as great as possible and the fixed rings 17*a*, 17*b* are separated from one another by the greatest possible distance. For each of the pairs of branches 13, the first ends 14 of each branch 12 accompany the separating movement of the fixed rings and are therefore separated from one another to the maximum extent, and this has an effect on the angle of opening between the two branches at the pivot connection 16. The result of this modification to the configuration of the pair of branches 13, in this instance the result of the flattening of the configuration, and of the connection between the second end of each branch 12 of this pair of branches 13 and the corresponding peripheral member 10 is that the peripheral member concerned moves closer to the main member, thus reducing the radial distance between them. In order not to block the radial movement of the peripheral member towards the main member 9, at least one of the second ends 15 of the branches 12 of the pair of branches 13 slides along the corresponding peripheral member 10. In this configuration, the attachment means 6 are thus brought as close as possible to one another, which is compatible with the grasping of small-diameter packing portions.

It should be noted that the deployment of the main member 9 alone gives rise to a simultaneous modification, in equal proportions, to the configuration of each pair of branches. It will be appreciated that, this being the case, the peripheral members 10 simultaneously as one move closer to the main member and in the same proportions.

FIG. 4 illustrates a second example of inclination of the pair of branches 13 so as to define a maximum radial distance between the main member 9 and the peripheral members 10. In this configuration, the telescopic body 18 is retracted to the maximum extent so that the length of the main member 9 is as short as possible and the fixed rings 17*a*, 17*b* are separated from one another by the shortest possible distance. For each of the pairs of branches 13, the first ends 14 of each branch 12 accompany the converging movement of the fixed rings and are therefore brought as close as possible to one another, and this has an effect on the angle of opening between the two branches at the pivot connection 16. The result of this modification to the configuration of the pair of branches 13, in this instance the result of the expanding of the configuration, and of the connection between the second end of each branch 12 of this pair of branches 13 and the corresponding peripheral member 10 is that the peripheral member concerned moves away from the main member, thus increasing the radial distance between them. In order not to block the radial movement of the peripheral member towards the main member 9, at least one of the second ends 15 of the branches 12 of the pair of branches 13 slides along the corresponding peripheral member 10. In this configuration, the attachment means 6 are thus separated from one another to the maximum extent, which is compatible with the grasping of large-diameter packing portions.

FIGS. 5 to 7 schematically illustrate an example of how the method of inserting a section 2 of packing according to the invention progresses.

As described previously, it is the insertion system 1 in its entirety, which is to say the insertion device 5 and the bearing structure 4 that allows the insertion method to be implemented. FIGS. 5 to 7 illustrate the insertion method once the adjustment step has been completed, which is to say after the radial distance between the main member and the peripheral members of the deployment module has been determined and the attachment means are ready to grasp hold of the sections of packing. Thus, FIG. 5 notably depicts a step of grasping hold of a section 2 of packing from the vertical pile 24 of packing sections 2. To do that, the insertion system 1 may move in its entirety as far as the pile 24 of packing sections, for example using rails 34 as mentioned previously.

The insertion device 5 is able in its entirety to perform a translational movement 35 relative to the bearing structure 4, for example a translation along the legs 7 vertically, which is to say parallel to said legs 7. This translational movement 35 may be brought about for example by the first motor 25 actuated remotely. This translational movement 35 is for example used so that the insertion device 5 reaches the top of the vertical pile 24 of packing sections 2 and overhangs same, as illustrated in FIG. 5. Once this has been achieved, and once the bearing structure 4 is positioned around the vertical pile 24 of packing sections 2, the translational movement 35 allows the insertion device 5 to be brought closer to the pile 24 of packing sections 2 so as to grasp hold of the packing section 2 at the top of said pile 24, using the attachment means 6. Once a section 2 of packing has been grasped, the insertion device 5 is moved once again vertically in order to pick up the packing section 2 grasped.

FIG. 6 illustrates a step of rotating the insertion device 5 and a step of moving the insertion system 1 as far as the casing 3. These two steps occur after a section 2 of packing has been grasped by the attachment means 6. In order to perform the step of rotating the insertion device 5 relative to the bearing structure 4, the insertion device 5 comprises rotation-performing means, in this instance using the system of gears illustrated in FIG. 1, which perform at least one rotation 36 by 90° or substantially 90° of the insertion device 5 relative to the bearing structure 4. The second motor 26 may be borne by the bearing structure 4 and controlled in such a way that the motor output shaft actuates the system of gears and therefore causes the rotation 36 of the insertion device 5 relative to the bearing structure 4. This rotation device driven by the second motor 26 thus allows the insertion device 5 to pivot between a first position referred to as vertical, that allows the sections 2 of packing to be grasped from the pile 24 of packing sections 2 as illustrated in FIG. 5, and a second position referred to as horizontal so as to position the grasped section 2 of packing so that it faces the horizontal casing 3 as illustrated in FIG. 6.

Thereafter, the bearing structure 4 can move, bearing the insertion device 5, so as to bring the grasped section 2 of packing closer to the casing 3 so that it can be inserted therein, for example by means of the rails 34 as mentioned previously. In order to stabilize the casing 3, the latter may be placed on supports 37.

FIG. 7 illustrates the step of positioning the insertion device 5 at the entrance to the casing 3 and the step of pushing the section 2 of packing into the casing 3. In order to position the section 2 of packing correctly at the entrance to the casing 3, the vertical position of the insertion device 5 may possibly be adjusted through the vertical translational movement along the legs 7 of the bearing structure 4 so that the grasped section 2 of packing perfectly faces the entrance to the casing 3. Once this has been done, the hooks 28 close onto the flange 29 of the casing 3 in order to hold the insertion device 5 facing the entrance to the casing 3.

The pushing step begins after the attachment means 6 have released the section 2 of packing. After the attachment means 6 have released the section 2 of packing and before the telescopic devices 22 are deployed to insert the section 2 of packing, the latter may for example rest on a retaining support 38 so that the section 2 of packing remains correctly positioned facing the entrance to the casing. The telescopic devices 22 then deploy so that the pushing means 23 inserts the section 2 of packing into the casing 3, as described hereinabove. Once the section 2 of packing has been inserted, the telescopic devices 22 can retract, and the insertion system 1 can move again to pick up the next section 2 of packing. The insertion method then recommences from the grasping step described in FIG. 5.

Of course, the invention is not restricted to the examples that have been just been described, and numerous refinements may be made to these examples without departing from the scope of the invention.

The invention, as has just been described, does indeed achieve its stated objective and is able to propose a device for inserting a section of packing into a casing comprising a deployment module able to grasp sections of packing of different diameters. Variants not described here may be implemented without departing from the scope of the invention provided that, in accordance with the invention, they comprise an insertion device according to the invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

The invention claimed is:

1. A method for inserting at least one section of packing for a gas/liquid separation column into a cylindrical casing, performed by an insertion system, the method comprising the steps of:
providing the insertion system, which is configured to insert the at least one section of packing for a gas/liquid separation column into the cylindrical casing, the insertion system comprising a bearing structure and an insertion device, wherein the insertion device is borne by the bearing structure, wherein the insertion device comprises a deployment module that is comprised of:
a main member centered about a main axis of the insertion device;
a plurality of peripheral members arranged circumferentially and uniformly around the main axis, each of the peripheral members comprising an attachment means configured to grasp hold of a packing section; and
a plurality of branches arranged as pairs of branches connecting the main member to one of the peripheral members,
wherein the deployment module is configured to modify the dimension of the insertion device by modifying a radial distance between the main member and each of the peripheral members;
adjusting the radial distance between the main member and the peripheral members of the deployment module;
using the attachment means of the insertion device to grasp hold of a section of packing;
rotating the insertion device, in its entirety, relative to the bearing structure;
moving the insertion system as far as the casing by the bearing structure;
positioning the packing section at an entrance to the casing; and
pushing the packing section into the casing.

2. The method according to claim 1, wherein the main member comprises a telescopic body able to modify a main dimension of the main member.

3. The method according to claim 2, wherein the main member comprises two fixed rings, each fixed ring being arranged at the level of each terminal portions of the main member, the two fixed rings being separated by a distance that can be modified by the telescopic body.

4. The method according to claim 1, wherein each branch of the pairs of branches comprises a first end fixed to one of the fixed rings of the main member and a second end fixed to the peripheral member.

5. The method according to claim 4, wherein the second end of at least one of the branches of the pair of branches is able to slide along the peripheral member.

6. The method according to claim 1, wherein each branch of the pairs of branches is connected one to the other by a pivot connection.

7. The method according to claim 1, further comprising locking means configured to fix the radial distance between the main member and the peripheral members.

8. The method according to claim 7, wherein the locking means are formed by deployable rods extending between two adjacent peripheral members.

9. The method according to claim 1, wherein the two branches of the pair of branches are secant with one another.

10. The method according to claim 9, wherein the two branches of the pair of branches are connected to one another at their point of intersection.

11. The method according to claim 1, wherein the insertion device is borne by the bearing structure in such a way as to be able to perform in its entirety a translational movement relative to the bearing structure.

12. The method according to claim 1, wherein the insertion device is borne by the bearing structure in such a way as to be able to perform in its entirety a rotational movement relative to the bearing structure.

* * * * *